(12) United States Patent
Dronzek, Jr. et al.

(10) Patent No.: US 7,592,057 B2
(45) Date of Patent: *Sep. 22, 2009

(54) REMOVABLE LABELS, COUPONS AND THE LIKE

(75) Inventors: Peter J. Dronzek, Jr., Thornwood, NY (US); Joseph R. Gervais, Granby, CT (US)

(73) Assignee: Polymeric Converting LLC, Enfield, CT (US)

( * ) Notice: Subject to any disclaimer, the term of this patent is extended or adjusted under 35 U.S.C. 154(b) by 96 days.

This patent is subject to a terminal disclaimer.

(21) Appl. No.: 10/505,383

(22) PCT Filed: Feb. 14, 2003

(86) PCT No.: PCT/US03/04764

§ 371 (c)(1),
(2), (4) Date: Aug. 20, 2004

(87) PCT Pub. No.: WO03/074200

PCT Pub. Date: Sep. 12, 2003

(65) Prior Publication Data

US 2005/0123705 A1 Jun. 9, 2005

(51) Int. Cl.
*B32B 33/00* (2006.01)
*B32B 9/00* (2006.01)
*G09F 3/00* (2006.01)

(52) U.S. Cl. ............... 428/40.1; 428/41.7; 428/41.9; 428/42.1; 428/42.2; 428/42.3; 428/43; 427/207.1; 427/208.4

(58) Field of Classification Search .............. 428/40.1, 428/41.3, 41.5, 41.7, 41.9, 42.1, 42.2, 42.3, 428/231, 354, 43; 283/81, 101; 427/207.1, 427/208.4

See application file for complete search history.

(56) References Cited

U.S. PATENT DOCUMENTS

| | | | |
|---|---|---|---|
| 3,702,258 A | 11/1972 | Gibbons | |
| 4,479,838 A | 10/1984 | Dunsirn et al. | |
| 4,544,590 A | 10/1985 | Egan | |
| 4,840,270 A | 6/1989 | Caputo | |
| 4,879,430 A | 11/1989 | Hoffman | |
| 5,130,804 A | 7/1992 | Tamura et al. | |
| 5,466,013 A | 11/1995 | Garrison | |
| 5,589,025 A | 12/1996 | Garrison | |
| 5,736,212 A | 4/1998 | Fischer | |
| 6,328,340 B1 | 12/2001 | Fischer | |
| 6,780,484 B2* | 8/2004 | Kobe et al. | 428/40.1 |
| 7,045,186 B2* | 5/2006 | Grabau et al. | 428/40.1 |
| 2001/0015554 A1 | 8/2001 | Casagrande | |
| 2002/0000718 A1 | 1/2002 | Schwarzbauer | |
| 2005/0147781 A1* | 7/2005 | Dronzek et al. | 428/40.1 |

* cited by examiner

*Primary Examiner*—Patricia L Nordmeyer
(74) *Attorney, Agent, or Firm*—James V. Costigan; Hedman & Costigan, P.C.

(57) ABSTRACT

An article of manufacture of removable segments, labels, coupons, and the like, as for identification, rewards and inventory control, which includes a support substrate film (17) structure having one or more selectively-pattern-treated (16) laminae for adhesively, but cleanly releasably, securing the segments, coupons and labels to the support structure (17).

94 Claims, 6 Drawing Sheets

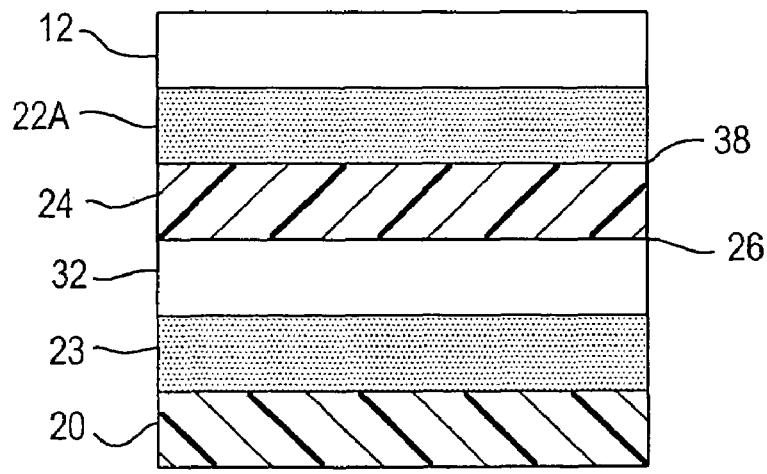
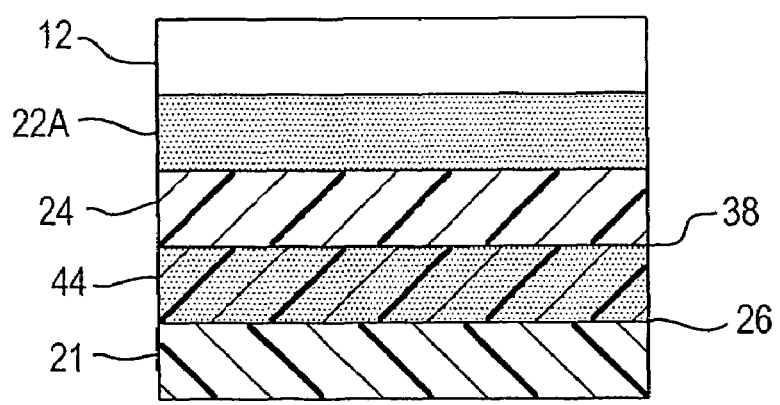

REMOVABLE LABELS, COUPONS AND THE LIKE

FIELD OF THE INVENTION

This invention relates to removable labels and coupons, as for purchase rebate awards, expanded information labels, game pieces, coupons and the like which include a portion to be adapted to identify an article and a portion to be peeled off. More particularly the removable portion comprises a sub-laminate with a selectively-patterned surface treated interface providing differential release properties, which, in turn, is adhesively secured to a support structure, such as a release paper, an article to be identified, or a container, and the like.

BACKGROUND OF THE INVENTION

Dronzek, Jr., in co-pending U.S. Patent Application Ser. No. 10/505,392, filed concurrently herewith, describes card intermediates such as a business form having an integral and removable card portion are unexpectedly improved if some of the films used as laminae with the form are patterned in a judicious way during surface treatment. It has been found that the same technology can be used in the production of removable coupons or labels.

Removable or couponable substrates have been made in the past with pattern or zone coating of pressure sensitive adhesive where the coupon would lie in a non adhesive area surrounded on at least two sides by adhesive to firmly hold it in place. The removable piece is perforated with the perforations ruptured by the end user when the piece is removed. This technique limits the use of polymeric films as substrates because perforations can be difficult to tear and will tear randomly in direction. The non adhesive coated area tends to pucker or wrinkle as the article it is affixed to is flexed, bent or undergoes changes in environmental conditions which is aesthetically unacceptable.

Dunsirn et al., U.S. Pat. No. 4,479,838, use a dry residue adhesive applied to the interface of the removable coupon and base paper to form a couponable assembly where the top sheet can be removed to leave a non tacky base and non tacky back side of the removable piece. The internal cohesion of the top sheet and base sheet are greater than the adhesion of the top sheet to the base sheet where the interface to allow for separation of the sheets is the adhesive that randomly splits leaving residue at the interface of both layers. The use of select area with no adhesive at the margin of the removable piece to form a tab to begin to peel the top sheet away or the use of a non adhesive extension of the top sheet beyond the base sheet to form a tab are disclosed by Dunsirn. These techniques while difficult to manufacture, have been found to be necessary commercially to begin separation of the sheets without excessive picking at the edge. It is not acceptable to have to frustratingly pick at the edge while possibly damaging the label when the bond of the sheets is as strong as needed to prevent pre-separation through manufacturing, handling and labeling.

Romagnoli, U.S. Pat. No. 4,060,168 describes a label face stock layer with indicia on the front and adhesive on the back adhering a backing layer which is releasable from a wax type coating on the backing layer. The printed face label is cut as a series of labels in a serial order and the backing material includes a die cut portion opposed to the label which remains adhered to the label upon application of the label to the container. The cut back portion which is smaller than the face label can contain print and be used as a premium removable piece for promotional purpose. The label is adhered to the container using the adhesive area of the face label which is larger than the back piece. The consumer must remove the entire label to access the back die cut piece. It is not universally acceptable to have consumers remove the sticky edged label to access the back portion to remove it, especially if it contains warning and hazard information. Many of the labels will be damaged or not reapplied leaving hazardous unmarked containers.

Eagon, U.S. Pat. No. 4,398,985 describes a complex coated and laminated construction having differential release characteristics produced by coating at least one surface of a face stock sheet with a non silicone containing release polymer; overcoating the release coating with a release film of non-silicone containing release polymer to form a sub-assembly; coating a substrate with a layer of adhesive which is then laminated to the release film layer of the sub-assembly to form a laminate. The release film is releasable from the coated face sheet upon the application of a delaminating force less than the force required to separate the release film from the adhesive or release film from the substrate. The differential in release is between the release film and the release coating and the release film and the adhesive which promotes the release of the release film from the release coating. Even though there is a release point at the release film interface with the release coating, this product is not universally acceptable because of the complex manufacturing requirements and the fact that the release force must be fairly tight to prevent pre-release in handling and processing which causes the user to pick at the edge with a fingernail in hopes of starting the release film to remove without damaging the face sheet.

Stern et al., U.S. Pat. No. 5,350,612 describe a multi-ply, wet strength, removable point of purchase coupon structure comprising a water resistant base sheet and a removable top sheet with printed matter on the upper exposed side. The two sheets are laminated with a non tacky adhesive disposed between the base sheet and top sheet for releasably adhering the sheets where the non tacky adhesive prevents the top sheet from adhering to other objects when the top sheet is removed. Adhesion and release characteristics are controlled by the adhesive composition combined with the release coating. To make a label with indicia on the top sheet printed in register with the base sheet, each individual sheet must be printed and inset in register when laminated. This is a difficult, high waste and time consuming process versus registering front to back on one sheet which is commonly done on conventional printing equipment which can not be employed in this case because the release coating does not allow for transfer to it. Additionally, while there is a release point at the adhesive interface with the release coating, this product is not universally acceptable because, as in Eagon, the release force must be fairly tight to prevent pre-release in handling and processing which causes the user to pick at the edge with a fingernail in hopes of starting the release film to remove without damaging the face sheet.

Schramer et al., U.S. Pat. No. 5,019,436 describes a multi-layer coextruded film of two dissimilar polymer materials that form a controlled interfacial bond between the layers sufficiently strong for handling and application while allowing the layers to be separated. The films used for the coextrusion allow for the primary package graphics on the article or container clearly show through. This product is not universally accepted because it must be used in conjunction with other graphics that show through when the outer surface layer is removed. In addition, ease of separation is difficult because the controlled interfacial bond must be tight enough to facilitate handling, processing and application which again means the end user must pick at the edge because it is the same controlled release across the entire coextruded film.

Egan, U.S. Pat. No. 4,544,590 discloses a method of making laminates for coupons or cards that leave no exposed adhesive on either surface when the layers are separated by releasably laminating two sheets through thermal pressure lamination. The mechanism of bonding thermal layers in this case is different from the other prior art of release layers, controlled interfacial coextruded bonds, dry splittable adhesives and the like but the same problem of ease of lift still exists.

Hoffman, U.S. Pat. No. 4,879,430, and its divisional, U.S. Pat. No. 5,130,804 (both having in the meantime expired), disclose and claim a method of making plastic web materials which are selectively treated in a patterned manner with corona discharge for forming into containers. The variable corona pattern described in the Hoffman Patents was intended to create areas of weak sealability or bond of thermally sealable adhesive layers in the areas of treatment.

Commercial coupon substrates are available from 3 Sigma LLC, Troy, Ohio known as circle coupon base material that consists of two layers of polyester that are laminated using circles of dry rupturable adhesive as separation interface. The back side of one layer is coated with pressure sensitive adhesive to affix the base to a support while conventional label substrates are printed and laminated to the top side of the other layer. The adhesive randomly splits and some stays with the base while some goes with the removable piece. Since the adhesive is applied in a circle pattern, the non adhesive areas serve as a finger lift area to solve the edge lift problem of the prior art. This product is not universally accepted because of the random splittable nature of the adhesive leaves a residue on the back of the removable piece that aesthetically can negatively impact graphics below it. In addition, the non adhesive areas can flag or "wing-up" if a flexible label stock is used and the edge of a die cut lands in one of the open non adhesive areas.

Technimagic™ is a substrate for manufacturing couponable labels available from Technicote, Miamisburg, Ohio that consists of a layer of polyester film with a release "breakaway" layer on one side and a permanent pressure sensitive adhesive on the other to affix the base to a support. A conventional label face stock with a patterned adhesive to provide a "finger lift" area after it is laminated to the "breakaway" layer is used to create a means to lift and remove a die cut piece. The Technicote literature dated February, 1995 is hereby incorporated by reference. The Technicote product is another attempt like the circle adhesive of 3 Sigma to solve the edge lift problem of the prior art to start to peel or remove the die cut piece without excessive picking at the edge to remove the piece. While this system can work successfully, special pattern non adhesive areas on the face material are needed to laminate to the breakaway layer that adds significant cost and the converter must die cut in register to the non adhesive area complicating processing.

It has now been found that the processes for making a removable substrate laminate or segments thereof such as a label, or a couponable label is simplified, and improved coupons and labels are obtained, if a patterned differential "surface-treated area" is caused to develop on a layer of the label substrate in at least the shape of the coupon or label.

The use of patterned "treated areas" provides substantial and surprising advantages in terms of selective separation of removable labels without patterned adhesives, co-extruded dissimilar, removable layers, rupturable adhesives, tabs or multiple layers of release coatings and dry adhesives where the end user must pick at the edge of the removable piece to lift the edge to begin to remove the piece.

Surface treatment is defined as the modification of the surface of at least one surface layer in a defined pattern of differential surface tension to create areas of differential release or separation of adhesives or coatings through the application of corona, flame, plasma or other surface treatment technique.

Differentially treated is defined as areas of treatment and non-treatment or areas of higher treatment and lower treatment.

This and other objects of the invention will become apparent from the present specification.

BRIEF DESCRIPTION OF THE DRAWINGS

In the drawings:

FIGS. 6 and 6a are cross-sectional views of still other intermediates for removable labels constructed in accordance with the present invention.

SUMMARY OF THE INVENTION

Figure 1:
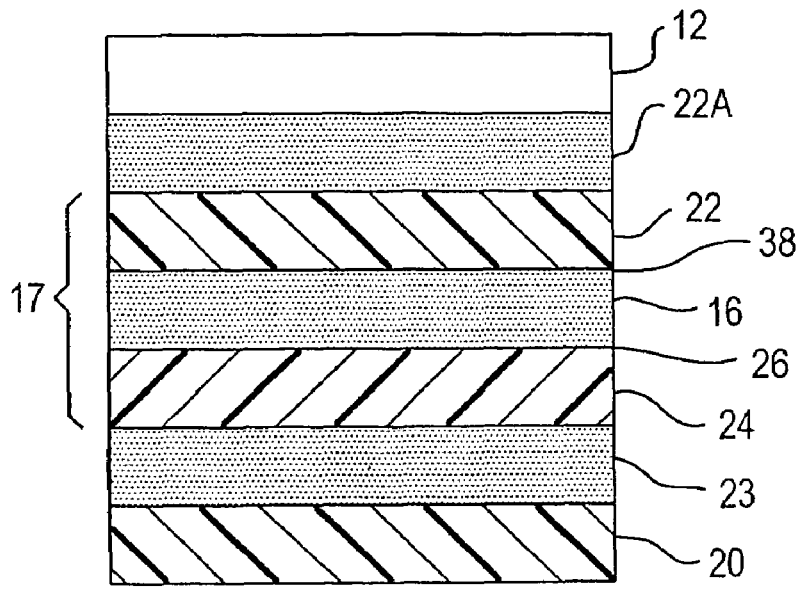
FIGS. 1-1a are cross-sectional views of an intermediate for removable labels constructed in accordance with the present invention.

According to a first major aspect of this invention, (FIG. 1) there are provided articles of manufacture having a separable and removable segment, label or coupon, comprising:

(i) a first support layer of film 22 having an upper surface with optional printed indicia and a lower surface with optional printed indicia which is permanent bond interface A 38;

(ii) a second thin film layer 24 having an upper surface and a lower surface, the upper surface being adhesively secured 16, directly, or through an underlying thin coated layer (not shown) with optional printed indicia to the lower permanently bonded interface A 38 of said lower surface of first thin film layer 22 (i) at a separable interface B 26;

(iii) a paper or film substrate 12 optionally printed with indicia laminated to the upper surface of the first thin film layer 22 (i) with adhesive 22A;

(iv) an optional adhesive layer 23 on the lower surface of second thin film layer 24 (ii);

(v) an optional releasable liner 20 if a pressure sensitive adhesive is used as 23 (iv); and (vi) a removable segment, label or coupon, having edges and defined in said first thin film layer 22 (i), said paper or film substrate optionally printed with indicia 12 (iii) by a diecut extending through said layers 12 (iii), and 22 (i) but not through said second thin film layer 24 (ii) if the removable piece is less than the total size of the label and through second thin film layer 24 (ii) if the removable piece is the total size of the label, wherein the removable diecut piece is provided with a pattern of selective variable adhesion through variable surface-treatment of the lower surface of said first layer 22 (i), the upper surface of layer 24 (ii) or both of said surfaces such that the adhesion at separable interface B 26 is always less than the adhesion at permanent interface A 38.

According to a second major aspect of this invention (FIG. 1*a*), there are provided articles of manufacture having a separable and removable segment, label or coupon, comprising:

(i) a first support layer of film 22 having an upper surface with optional printed indicia and a lower surface with optional printed indicia which is separable interface B 26;

(ii) a second thin film layer 24 having an upper surface and a lower surface, the upper surface being adhesively secured 16, directly, or through an underlying thin coated layer (not shown) with optional printed indicia to the lower separable interface B 26 of said lower surface of first thin film layer 22 (*i*) at a permanent interface A 38;

(iii) a paper or film substrate 12 (not shown) optionally printed with indicia laminated to the upper surface of the first thin film layer 22 (*i*) with adhesive 22A (not shown);

(iv) an optional adhesive layer 23 (not shown) on the lower surface of second thin film layer 24 (*ii*);

(v) an optional releasable liner 20 (not shown) if a pressure sensitive adhesive is used as 23 (*iv*); and (vi) a removable segment, label or coupon, having edges and defined in said first thin film layer 22 (*i*), said paper or film substrate optionally printed with indicia 12 (*iii*) (not shown) by a diecut extending through said layers 12 (iii), and 22 (*i*) but not through said second thin film layer 24 (*ii*) if the removable piece is less than the total size of the label and through second thin film layer 24 (*ii*) if the removable piece is the total size of the label, wherein the removable diecut piece is provided with a pattern of selective variable adhesion through variable surface-treatment of the lower surface of said first layer 22 (*i*), the upper surface of layer 24 (*ii*) or both of said surfaces such that the adhesion at separable interface B 26 is always less than the adhesion at permanent interface A 38.

According to a third major aspect of this invention (FIG. 2*a*), there are provided articles of manufacture for providing a removable segment, label or coupon comprising:

(i) a first support layer of film 22 having an upper surface with optional printed indicia (not shown) and a lower surface which is separable interface B 26;

(ii) a second thin film 24 layer having an upper surface and a lower surface, the upper surface having a permanent interface A 38 adhesively secured 16 through an underlying thin coated layer 32 with optional printed indicia (not shown) to the lower separable interface B 26 of said lower surface of first thin film layer 22 (*i*).

(iii) a paper or film substrate 12 (not shown) optionally printed with indicia laminated to the upper surface of the first thin film layer (i) 22;

(iv) an optional adhesive layer 23 (not shown) on the lower surface of second thin film layer 24 (*ii*) (not shown);

(v) an optional releasable liner 20 (*v*) (not shown) if a pressure sensitive adhesive is used as 23 (*iv*) (not shown); and (vi) a removable segment, label or coupon, having edges and defined in said first thin film layer 22 (*i*), said paper or film substrate 12 (not shown) optionally printed with indicia (iii), and said second film layer 24 (*ii*) by a diecut extending through said layers 12 (*iii*), and 22 (*i*) but not through said second thin film layer 24 (*ii*) if the removable piece is less than the total size of the label and through second thin film layer 24 (*ii*) if the removable piece is the total size of the label, wherein the removable diecut piece is provided with a pattern of selective variable adhesion through variable surface-treatment of the lower surface of said first layer 22 (*i*), the upper surface of layer 24 (*ii*) or both of said surfaces such that the adhesion at separable interface B 26 is always less than the adhesion at permanent interface A 38.

According to a fourth major aspect of this invention, (FIG. 2-*b*) there are provided articles of manufacture for providing a separable and removable segment, label or coupon, comprising:

(i) a first support layer of film 22 having an upper surface with optional indicia (not shown) and a lower surface which is permanent bond interface A 38;

(ii) a second thin film layer 24 having an upper surface and a lower surface, the upper surface is separable interface B adhesively secured 16 through an underlying thin coated layer 32 with optional printed indicia (not shown) to the permanent interface A of said lower surface of the first thin film layer 22 (*i*).

(iii) a paper or film substrate 12 (not shown) optionally printed with indicia laminated to the upper surface of the first thin film layer 22;

(iv) an optional adhesive layer 23 (not shown) on the lower surface of second thin film later 24 (*ii*);

(v) an optional releasable liner 20 (not shown) if pressure sensitive adhesive 23 is used as (iv); and (vi) a removable segment, label or coupon, having edges and defined in said first thin film layer 22 (*i*), said paper or film substrate optionally printed 12 (not shown) with indicia (iii), and said second film layer 24 (*ii*) by a diecut extending through said layers (i), and (iii) but not through said second thin film layer 24 (*ii*) if the removable piece is less than the total size of the label and through second thin film layer 24 (*ii*) if the removable piece is the total size of the label, wherein the removable diecut piece is provided with a pattern of selective variable adhesion through variable surface-treatment of the lower surface of said first layer 22 (*i*), the upper surface of the second layer 24 (*ii*) or both of said surfaces such that the adhesion at separable interface B 26 is always less than the adhesion at permanently-bonded interface A 38.

According to a fifth major aspect of this invention (FIG. 2*c*), there are provided articles of manufacture having a removable segment, label or coupon comprising:

(i) a first support layer of film 22 having an upper surface with optional printed indicia (not shown) and a lower surface which is separable bond interface B 26;

(ii) a second thin film layer 24 having an upper surface and a lower surface, the upper surface with optional printed indicia (not shown) being adhesively secured through a dry adhesive 44 with release properties to the lower separably bonded interface B 26 of said lower surface of first thin film layer 22 (*i*) at a permanent interface A 38;

(iii) a paper or film substrate 12 (not shown) optionally printed with indicia laminated to the upper surface of the first thin film layer 22;

(iv) an optional adhesive layer 23 on the lower surface of second thin film later 24 (*ii*);

(v) an optional releasable liner 20 if a pressure sensitive adhesive is used as 23 (*iv*); and (vi) a removable segment, label or coupon, having edges and defined in said first thin film layer 22 (*i*), said paper or film substrate 12 (not shown) optionally printed with indicia (iii), and said second film layer 24 (*ii*) by a diecut extending through said layers (i), and (iii) but not through said second thin film layer 24 (*ii*) if the removable piece is less than the total size of the label and through second thin film layer 24 (*ii*) if the removable piece is the total size of the label, wherein the removable diecut piece is provided with a pattern of selective variable adhesion through variable surface-treatment of the lower surface of said first layer 22 (*i*), the upper surface of the second layer 24 (*ii*) or both of said surfaces such that the adhesion at separable interface B 26 is always less than the adhesion at permanent interface A 38.

According to a sixth major aspect of this invention (FIG. 2*d*), there are provided articles of manufacture having a removable segment, label or coupon comprising:

(i) a first support layer of film 22 having an upper surface with optional printed indicia (not shown) and a lower surface which is permanent bond interface A 38;

(ii) a second thin film layer 24 having an upper surface and a lower surface, the upper surface with optional printed indicia (not shown) being adhesively secured through a dry adhesive 44 with release properties to the lower permanent bonded interface A 38 of said lower surface of first thin film layer 22 (*i*) at a separable interface B 26;

(iii) a paper or film substrate 12 (not shown) optionally printed with indicia laminated to the upper surface of the first thin film layer 22;

(iv) an optional adhesive layer 23 on the lower surface of second thin film later 24 (*ii*);

(v) an optional releasable liner 20 if a pressure sensitive adhesive is used as 23 (*iv*); and (vi) a removable segment, label or coupon, having edges and defined in said first thin film layer 22 (*i*), said paper or film substrate 12 (not shown) optionally printed with indicia (iii), and said second film layer 24 (*ii*) by a diecut extending through said layers (i), and (iii) but not through said second thin film layer 24 (*ii*) if the removable piece is less than the total size of the label and through second thin film layer 24 (*ii*) if the removable piece is the total size of the label, wherein the removable diecut piece is provided with a pattern of selective variable adhesion through variable surface-treatment of the lower surface of said first layer 22 (*i*), the upper surface of the second layer 24 (*ii*) or both of said surfaces such that the adhesion at separable interface B 26 is always less than the adhesion at permanent interface A 38.

According to a seventh major aspect of this invention, (FIG. 5) there are provided articles of manufacture for providing a separable and removable segment, label or coupon, comprising:

(i) a paper or film substrate 12 optionally printed with indicia having an upper and a lower surface laminated at a permanent interface A 38 to the upper surface of;

(ii) a thin film layer 24 having an upper surface and a lower surface, the upper surface being adhesively secured 16, directly, or through an underlying thin coated layer 32 to the permanent interface A 38 of said lower surface of said paper or film substrate 12 (*i*) at a separable interface B 26;

(iii) an optional adhesive layer 23 on the lower surface of said thin film layer 24 (*ii*);

(iv) an optional releasable liner 20 if a pressure sensitive adhesive is used as 23 (*iv*); and (v) a removable segment, label or coupon, having edges and defined in said paper or film substrate 12 (*i*) optionally printed with indicia (not shown) and in said thin film layer 24 (*ii*) by a diecut extending through said layer (i), but not through said thin film layer (ii) if the removable piece is less than the total size of the label and through thin film layer 24 (*ii*) if the removable piece is the total size of the label, wherein the removable diecut piece is provided with a pattern of selective variable adhesion through variable surface-treatment of the upper surface of layer 24 (ii) such that the adhesion at separable interface B 26 is always less than the adhesion at permanent interface A 38.

According to an eighth major aspect of this invention, (FIG. 5*a*) there are provided articles of manufacture for providing a separable and removable segment, label or coupon, comprising:

(i) a paper or film substrate 12 optionally printed with indicia (not shown) having an upper and a lower surface laminated at a permanent interface A 38 to the upper surface of;

(ii) a thin film layer 24 having an upper surface and a lower surface, the upper surface being adhesively secured, by a dry adhesive with release properties 44, to the permanent interface A 38 of said lower surface of said paper or film stock 12 (*i*) at a separable interface B 26;

(iii) an optional adhesive layer 23 on the lower surface of said thin film layer (ii);

(iv) an optional releasable liner 20 if a pressure sensitive adhesive is used as 23 (*iv*); and (v) a removable segment, label or coupon, having edges and defined in said paper or film substrate 12 optionally printed with indicia (i) and in said thin film layer 24 (*ii*) by a diecut extending through said layer (i), but not through said thin film layer (ii) if the removable piece is less than the total size of the label and through thin film layer (ii) if the removable piece is the total size of the label, wherein the removable diecut piece is provided with a pattern of selective variable adhesion through variable surface-treatment of the upper surface of layer 24 (*ii*) such that the adhesion at separable interface B 26 is always less than the adhesion at permanent interface A 38.

According to a ninth major aspect of this invention, (FIG. 6) there are provided articles of manufacture for providing a separable and removable segment, label or coupon, comprising:

(i) a paper or film substrate 12 optionally printed with indicia (not shown) having an upper and a lower surface laminated at a permanent interface A 38; to the upper surface of (ii) a thin film layer 24 having an upper surface and a lower surface, the lower surface being adhesively secured through an underlying thin coated layer 32 at a separable interface B 26; to the upper surface of (iii) a pressure sensitive adhesive layer 23 on the upper surface of;

(iv) a releasable liner 20; and (v) a removable segment, label or coupon, having edges and defined in said paper or film substrate 12 optionally printed with indicia (not shown) (i), in said thin film layer 24 (*ii*), and in said pressure sensitive adhesive layer 23 (*iii*) by a diecut extending through said layers 12 (*i*), 24 (*ii*) and 23 (*iii*) wherein the removable diecut piece is provided with a pattern of selective variable adhesion through variable surface-treatment of the lower surface of layer (ii) such that the adhesion at separable interface B is always less than the adhesion at permanent interface A.

According to a tenth major aspect of this invention, (FIG. 6*a*) there are provided articles of manufacture for providing a separable and removable segment, label or coupon, comprising:

(i) a paper or film substrate 12 optionally printed with indicia and having an upper and a lower surface;

(ii) a thin film layer 24 having an upper surface and a lower surface, the lower surface being adhesively secured, by a dry adhesive with release properties 44 at a permanent interface A 38; to upper surface of (iii) a support layer 21;

(iv) a removable segment, label or coupon, having edges and defined in said paper or film substrate 12 optionally printed with indicia (i), in said thin film layer 24 (*ii*), and in said dry adhesive with release properties layer 44 by a diecut extending through said layers (i) and (ii) but not through said support layer (iii) wherein the removable diecut piece is provided with a pattern of selective variable adhesion through variable surface-treatment of the lower surface of layer 24 (*ii*) upper surface of support layer 21 (*iii*) or both said surfaces such that the adhesion at separable interface B 26 is always less than the adhesion at permanent interface A 38.

In another aspect of the invention, a programmable electronic tag also known as a transponder such as a radio frequency identification (RFID) transmitter is captured between layers of the lamination to produce a smart card or label for automatic identification and control.

RFID is based around radio or electromagnetic propagation which has the ability to allow energy to penetrate through paper or polymeric layers of a laminate to read a tag that may or may not be visible.

The basic RFID system consists of three components, an antenna or coil, a transceiver (with decoder) and a RF tag (also known as a transponder that is electronically programmed with information. The antenna emits radio signals to activate the tag and read or write data to it and acts as the conduit between the transponder (tag) and transceiver which controls the systems data acquisition and communication.

Active RFID tags are powered by an internal battery and can be typically read from and written to. Passive RFID tags operate without a separate external power source and obtain operating generated from the reader. Passive tags are much smaller, lighter and less expensive than active tags and have an extended operational lifetime but require shorter read ranges and a higher powered reader and generally are read only.

U.S. Pat. No. 5,448,110 to Tuttle hereby incorporated by reference discloses enclosed transceivers that are suitable for mass production in web sheet and tape formats or for use as stickers affixed to a device.

U.S. Pat. No. 5,497,140 to Tuttle discloses a miniature RFID system captured between layers for use as a postage stamp and the like.

Our invention differs from those of Tuttle where through differential treatment, we are providing a means for a device to be embedded between layers of the lamination of the invention providing a removable segment, card, coupon, tag or label with a smart embedded device. The device can be read or written at any time and can then subsequently be removed with the removable piece through differential treatment and subsequently re-read or written to through the useful life of the item.

Special mention is made of the following preferred embodiments: Namely, those, if present, in which the pattern of the treated area and the non-treated area extends under the removable area defined by the diecut;

the layer or layers comprise a polyester film, 0.2 to 7 mils thick;

the paper or film substrate layer comprises paper or film polymer stock known to those skilled in the art such as cellulosic paper, polyethylene, polypropylene, etc.;

the means for providing selective variable adhesion through variable surface treatment is selected from corona-treatment, flame-treatment, plasma-treatment, an obviously equivalent-treatment, or a combination of any of the foregoing treatments;

the treatment is carried out under conditions which produce a measurable differential of at least 1 dyne/cm, measured in a suitable apparatus, e.g. using a surface tension test fluid such as Accu Dyne Test Fluid from Diversified Enterprises, Claremont, N.H., at the time of treatment;

the pattern of the treated area covers from at least about 10 to about 90 percent of the surface and the untreated area covers from at least about 90 to about 10 percent of the surface;

preferably the pattern of the treated area covers from at least about 40 to about 60 percent of the surface and the untreated area covers from at least about 60 to about 40 percent of the surface;

the treated area preferably comprises a repeating pattern;

the repeating pattern may comprise areas bounded by: regular or irregular saw-tooth edges, a sine-wave pattern, a herring-bone pattern, a closed curve, a polygon, or any geometric shapes or obvious equivalents thereof;

the surface modification that is achieved by the surface treatment is based on the use of a predetermined power level that is varied by increasing or decreasing the power of the treatment, by increasing or decreasing the exposure time of the treatment, or by increasing or decreasing the distance between the treatment source and the surface to which said treatment is applied.

DETAILED DESCRIPTION OF THE INVENTION

When used herein and in the appended claims, the term "polymer substrate" includes, but is not limited to, a polymer film, foil or a coated polymer layer on the surface of another substrate such as paper, film or foil the polymer film can be opaque or transparent.

"Corona treatment" is a process consisting of a voltage source, electrode, a dielectric and ground. High voltage is applied to the electrode. Between the electrode and ground is a dielectric, comprised of the substrate, air and an insulator such as silicone or ceramic. The voltage buildup on the electrode ionizes the air in the electrode/substrate gap, causing the formation of highly energized corona which excites the air molecules, reforming them into a variety of free radicals which then bombard the substrate surface increasing it's polarity by distributing free bond sites across it. There are two basic types of treater designs; conventional which uses a dielectric covered roll and bare-roll which uses a dielectric covered electrode.

"Flame treatment" is a process where a lean gas mixture is burned and the excess oxygen is rendered reactive by the high temperature and like corona, it induces an ionized airstream which alters the surface of the substrate as it impinges on it.

"Plasma treatment" requires a partial vacuum where a gas is introduced into an evacuated chamber and ionized by a radio frequency (RF) field. The RF field excites the gas molecules creating a blend of neutral atoms and reactive radicals formed from free electrons which bombard the surface of the substrate causing (1) Ablation which is the "cleaning" of the surface by removal of its outer molecular layer; (2) Crosslinking—interconnection of long chain molecules; (3) Activation impartation of reactive molecules which in an oxygen rich atmosphere increase the surface energy of the substrate.

"Obviously equivalent" other methods of surface treatment contemplated include ozone, ultra-high frequency electrical discharge, UV or laser bombardment or any other process that alters the surface of the substrate to promote adhesion of coatings or adhesives. In the case of this invention, the treatment is performed in a pattern and the degree of surface treatment is used to control the release or adhesion characteristics. A pattern can include areas of treatment and areas of non-treatment or the entire layer can be treated with areas of high treatment and areas of low treatment.

Figure 3:
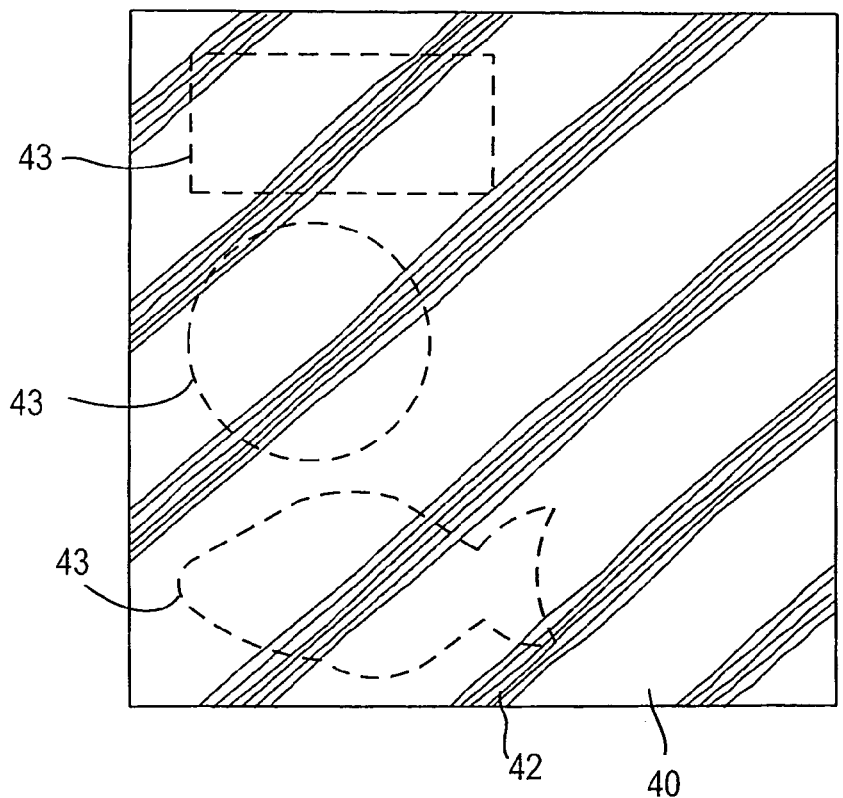
FIG. 3 shows a pattern formed by corona treatment of a sheet or roll, using a patterned system roller used in an apparatus as schematically illustrated in FIG. 4. Diecut patterned segments can be provided as shown in phantom in FIG. 3.

Referring to FIG. 1, label or coupon intermediate structure 10 is comprised of paper or polymer film 12 (printed or non-printed) to which film layer subassembly 17 is bonded by pressure sensitive or dry laminating adhesive 22A. Subassembly 17 consists of thin film layer denoted 22 with permanent interface A 38 connected to separable interface B 26 on thin film layer denoted 24 through adhesive 16. Optionally provided is an adhesive layer 23 with release layer 20 if a pressure sensitive adhesive is used to affix the assembly to an item or surface. At their adhesively-connected layer 16 interface, one, the other or both of them have been provided with a patterned differential surface treatment, provided that when both surfaces are treated interface B 26 is treated to a lesser extent than permanent interface A 38. This is illustrated in FIG. 3, wherein treated area 42 and untreated or lower treated area 40 are elements of the pattern. Such a structure provides an easily separable interface to lift the coupon, segment or label edge combined with differential separation properties sufficient to prevent pre-release of the coupon, segment or label through normal handling and processing. This separable interface 26 is designated herein and in the appended claims as interface B. The permanent interface, 38, is designated herein and the appended claims as interface A. The differential separation is accomplished using patterned flame-, plasma- or corona-treating techniques, or obvious equivalents thereof. The adhesive 16 or optionally, the adhesive and thin polymer film layer (not shown) transfers to thin polymer film layer 22.

Figure 1A:
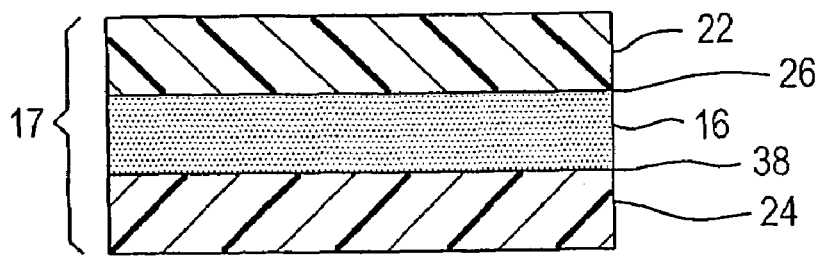

Referring to FIG. 1a, Subassembly 17 consists of the same elements as subassembly 17 in FIG. 1, except that the treatment is carried out so as to invert separable interface B 26 and permanent interface A 38.

Figure 2A:
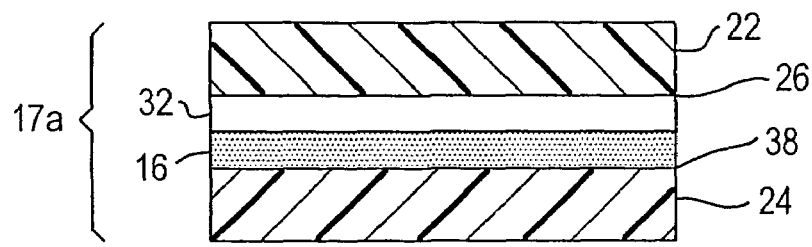
FIGS. 2a-d illustrate in more detail the elements especially preferred for producing the separable interface B, as will be explained hereinafter.
Figure 2B:
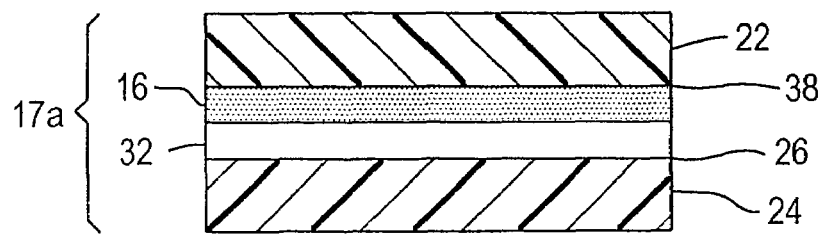

Referring now to FIG. 2a-b, these embodiments of the invention differ from the embodiment in FIG. 1 in the nature of the two polyester subassembly 17 of FIG. 1 by illustrating the optional adhesive deadening transfer breakaway layer 32. Polyesters 22 and 24, respectively, one, the other, or both carrying patterned treated surfaces, are adhesively bonded by adhesive 16 through an intermediate deadening or breakaway transfer layer 32, which preferably is a synthetic resin coating. Such a structure provides separable interface B 26 with differential release properties of the releasable layer to allow for easy separation of the edge of the segment, label or coupon in the areas of non-treatment or reduced levels of treatment with sufficient adhesion in treated areas to prevent pre-removal during handling and processing. The interface 26 is also designated herein and in the appended claims as interface B. The permanent interface, 38, is designated herein and the appended claims as interface A. These embodiments produce a differential adhesion removable portion of a label, segment or coupon where the adhesive 16 with deadening transfer layer 32 transfers to the permanent interface A 38.

Figure 2C:
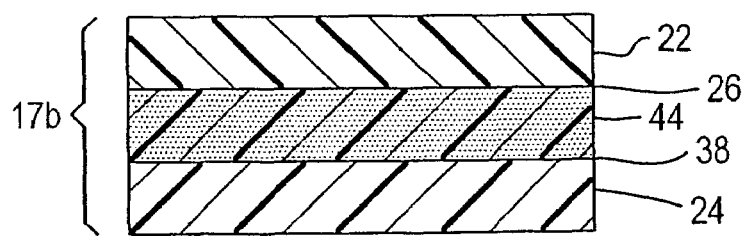

FIG. 2c, illustrates an embodiment of the invention wherein the two polymer films 22 and 24 are held together by a dry adhesive 44 with release properties controlled by treatment levels.

Figure 2D:
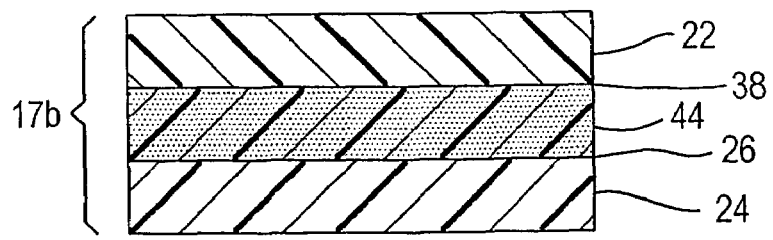

FIG. 2d, Subassembly 17b consists of the same elements as subassembly 17b in FIG. 2c, except that the treatment is carried out so as to transpose separable interface B 26 and permanent interface A 38.

FIG. 3, a schematic diagram is provided which denotes a specimen with treated areas 42 and untreated areas or areas of lesser treatment 40 which comprise elements of the pattern. Various diecut segments 43 are shown in phantom.

Figure 4:
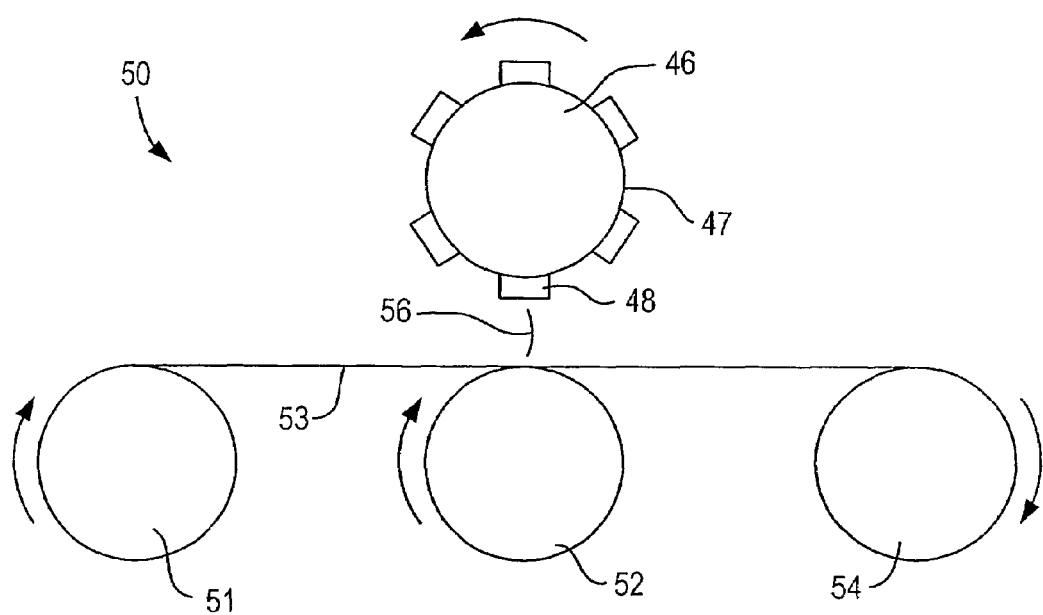

FIG. 4 this illustrates in flow diagram form a cross sectional view of an apparatus 50 for treating a web polymer film selectively patterned by corona energy 56 emitted by a roller machined into a pattern generating configuration by providing uninsulated sectors 48 separated by optionally insulated sectors 47 under the influence of grounded roller 52. It is important in securing uniform pattern development that the material 53 and roller 46 travel in synchronized speed. Those skilled in the art will recognize that treatment is influenced by the speed of the material 53, and rollers 52, and 46, the distance between the roller 52 and 48 and/or 47, and the power supplied to 46.

Figure 5:
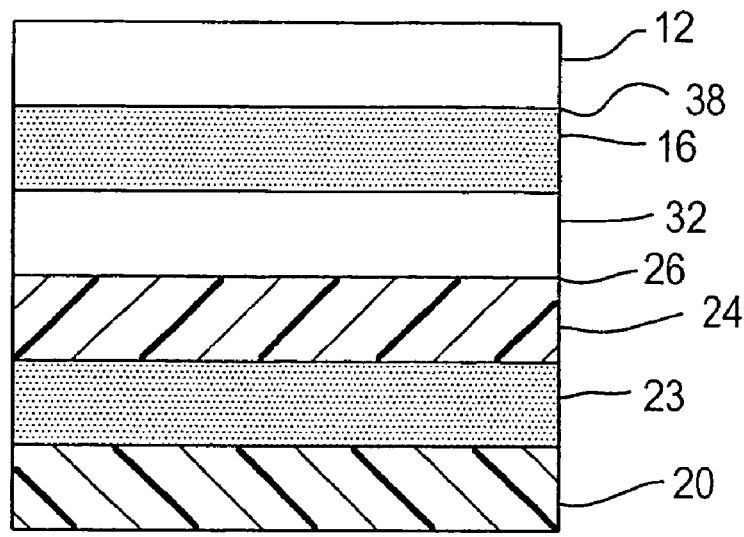
FIGS. 5 and 5a are cross-sectional views of other intermediates for removable labels constructed in accordance with the present invention.

Another embodiment of the invention is illustrated by FIG. 5 where subassembly 17 in FIG. 1 is modified to remove thin film layer 22, where the adhesive transfer and deadening breakaway layer 32 is applied to adhesive layer 16 and where the transfer layer can be printed with indicia and functions as a replacement for thin film layer 22. Permanent interface A 38 is now the surface of the adhesive 16 on deadening breakaway transfer layer 32 and releasable interface B 26 is the interface of thin film 24 and the deadening breakaway transfer film 32.

Figure 5A:
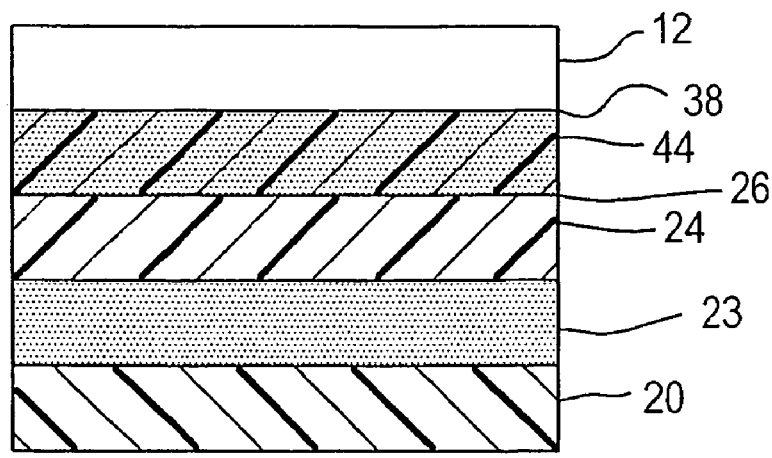

FIG. 5a illustrates another embodiment of the invention illustrated by FIG. 5 where adhesive 16 and deadening breakaway transfer layer 32 are replaced by dry adhesive with release properties 44.

Still another embodiment of the invention is illustrated by FIG. 6 where FIG. 5 is modified to replace adhesive 16 with adhesive 22A and to locate deadening breakaway transfer film 32 between film layer 24 and adhesive 23. Permanent interface A 38 is located at the upper surface of film 24 and separable interface B 26 is located at the lower surface of thin film 24. The other layers have the meaning aforementioned in assigning reference characters.

Referring to FIG. 6a this differs from FIG. 6 in that adhesive 23 and deadening breakaway transfer layer 32 are replaced with dry adhesive with release properties 44.

Whether the adhesive or adhesive with release, deadening or breakaway layer transfers to the substrate or to the coupon or label is not a critical aspect of this invention though it is preferable to transfer to the back of the label or coupon for indicia application or signature compatibility. The differential surface treatment of areas on a layer of polymeric film to produce areas of easy separation to begin to remove the removable coupon or label combined with areas of tight separation to hold the coupon or label in the substrate during normal handling before it is removed by the consumer is the invention.

Many different polymeric films such as polyester, polypropylene, vinyl, polyethylene or combinations can be used to achieve the results of the invention based on the chemistry of the adhesive, breakaway fugitive layer, release or deadening layer in combination with the surface treatment level of the film layer(s). What is important is the differential adhesion achieved between a specific coating chemistry and the treated and untreated areas of a specific polymeric surface. For example some coatings will bond tenaciously to treated and non treated areas. Others will produce a permanent bond in both areas at certain treatment levels, all easily removable bonds at another and the desired differential adhesion that provides ease of edge lift with controlled separation at another treatment level.

Once an easily separable area of a pattern treated surface is lifted or separated, the entire layer will continue to lift and the separation propagates through the treated areas. This can be likened to a roll of tape where it is difficult to start dispensing from the roll unless the leading edge can be easily separated. If not easily separated you pick at it with your fingernail until it is removed. The manufacturer typically reduces the tack at the starting edge for ease of separation using a lift tab to begin dispensing. Starting separation can be difficult in higher treated areas without differential, non-treated or lower treated areas to allow for separation which results in most cases in damage to the labels, coupon or even the substrate during attempted separation. It has been found that the non treated areas or areas treated with less energy preferably should be from about 40 to about 60% of the surface area of the differential treated layer depending on the construction (e.g., tear strength) of the coupon or label but can range from about 10 to about 90%.

The determination of fitness for use is a practical one where laminations are made using different chemistries where the surfaces of one or both of the layers is treated in a pattern for a period of time. The duration of treatment or residence time under flame, plasma or corona along with variations in energy impinged on the surface of the film can vary the treatment level differential of the pattern and will lead to different results. It is important to the invention to control residence time and energy level for controlled separation tailored to specific chemistries otherwise the bond of the treated surface can become permanent.

Testing Procedures and Results

Laminates in accordance with the present invention were prepared and tested and with the following results:

EXAMPLE 1

A convential web of non-surface-treated 144 gauge oriented PET polyester (1.44 mil) (available from Advanced Web Products, 529 Fifth Ave., NY, USA) was corona discharge treated at 100 ft/min. using a power supply (model No. AB6628) available from Pillar Technologies, Inc., Heartland, Wis., USA, and a modified corona treater (AB1977) which was designed to operate with a rotary electrode according to FIG. 4 using a pattern of lands and valleys as in FIG. 3 on a 45 degree angle across the running direction of the width of the material to form a pattered treated web. The width of the treated area was ³⁄₁₆ inches and the non-treated area was ³⁄₁₆ inches.

A 100% surface treated web of 200 gauge oriented PET polyester was prepared using a power output of 0.4 KW and corona discharge apparatus adapted to treat the whole surface. This treated web was gravure coated with a modified carboxylated acrylic latex prepared as follows: 80 parts Hystrex V43 (acrylic latex from B.F. Goodrich) 19 parts polyethylene 40 from Chemical Corp. of America, and 1 part Aziridine Crosslinker from Adhesion Systems, Inc. Patterson N.J., at a coat weight of 1.5-2.0 grams/1000 sq. in. on a dry coated base immediately following corona treatment using the apparatus set forth above with a bare roll and the resulting coated web was laminated at 60 psi (140° F.) to the patterned treated web and was allowed to cure for 48 hours. Release tests in grams/inch of width were performed to peel the uncoated layer of the laminate from the coated layer with release of the dry adhesive from the pattern treated layer to the fully treated layer.

For comparative purposes, five additional samples were prepared using the same materials but varying the power output to the modified corona treater for the 1.44 mil. oriented PET polyester web.

Release values were determined on a conventional release tester set at a 180 degree peel angle using at 12 inches/minute. Release values are stated in a range from average low to average high value.

TABLE I

| Power Output KW | Release MD grams/in | Release TD grams/in |
| --- | --- | --- |
| 0.01 | 26-34 | 24-35 |
| 0.02 | 38-47 | 36-44 |
| 0.03 | 52-58 | 50-58 |
| 0.04 | 66-75 | 63-74 |
| 0.05 | 88-102 | 83-96 |
| 0.06 | 110-126 | 108-124 |

MD = machine direction
TD = transverse direction

It was noteworthy that with this configuration, release values increased fairly uniformly as the power increases for the MD and TD tests.

The webs assembled by Example 1 are used as interlaminar sub-assemblies in producing assemblies such as those described in FIGS. 1; 1a; 2c; 2d; 5a; and 6a using conventional adhesives, conventional release agents and conventional laminating conditions. The adhesives and release agents are commercially available and may be used according to the manufacturers directions.

EXAMPLE 2

Non-surface-treated 65 gauge oriented PET polyester (0.65 mil) was corona discharge treated in a sine wave pattern continuously across a web using the modified corona treater described in Example 1. Using the power outputs set forth in Table II the amplitude of the sine wave was ¼ inch and the thickness of the electrode providing the treatment was ³⁄₃₂ inch the frequency of the sine wave one-half inch running in the machine direction with a phase difference of one-half inch across the web.

A coating of a modified polyurethane available from Adhesion Systems, Patterson, N.J., AS37637 (19-21% solids; viscosity 100-500 cps) was applied at a coat weight of 0.8 grams dry/1000 sq. in. immediately following treatment. The resulting coated web is laminated with laminating adhesive PD384-30 Adhesion Systems Inc. (38-40% solids; 20-200 CPS at 60 psi and 140° F.) mixed with 1% of a 100% solid polyfunctional aziridine cross-linker (AS316 Adhesion Systems Inc.) to a 100% surface treated layer of 65 gauge oriented PET polyester that was corona discharge treated at 0.4 KW power output using the apparatus described in Example 1. The laminate was cured for 48 hours and peel tests in grams/inch of width were performed to peel the uncoated layer of the laminate from the coated layer with transfer of the breakaway coating from the pattern treated film to the fully treated film.

For comparative purposes, the speed of the web of polyester, the power output to the corona pattern treater in KW was varied.

Release values were determined on a conventional release tester set at 180 degree peel angle and 12 inches/minute rate and repeated in Table II. Release values are stated in a range from average low to average high value.

TABLE II

| Power Output KW | Release MD grams/in | Release TD grams/in |
| --- | --- | --- |
| 0.01 | 14-20 | 15-42 |
| 0.02 | 26-35 | 14-52 |
| 0.03 | 46-54 | 15-58 |
| 0.04 | 62-84 | 16-77 |

TABLE II-continued

| Power Output KW | Release MD grams/in | Release TD grams/in |
|---|---|---|
| 0.05 | 91-114 | 15-91 |
| 0.06 | 118-145 | 16-117 |

MD = machine direction
TD = transverse direction

It is noteworthy that with the sine wave pattern running in the machine direction, release values increase as the power increases but the distribution is tighter because theoretically there is always approximately the same amount of treated surface area per inch of width. In the transverse direction, the distribution is wider because the gaps between the sine waves show easy release while the treated area shows increasing release values as power is increased as one checks across the sine wave in the TD direction rather than along the sine wave in the MD direction.

The webs assembled by Example 2 are used as interlaminar sub-assemblies in producing assemblies such as those described in FIGS. 1; 1*a*; 2*c*; 2*d*; 5*a*; and 6*a* using conventional adhesives and conventional laminating condition.

It should be recognized that different coatings, coat weights, patterns, power levels, substrates, speeds, etc. all contribute to the release characteristics and the above data presented for illustrative purposes only.

The patents, applications, publications and test methods mentioned above are incorporated herein by reference.

Many variations of the present invention will suggest themselves to those skilled in the art in light of the above detailed description. For example, instead of paper, synthetic paper can be used. Instead of polyester, polyolefins can be used. Instead of transparent film layers used as printed forms, opaque polymer film can be used to mask information buried in the card element such as a radio frequency transmitter. Instead of a polyurethane coating, a poly(ethylene vinyl acetate) resin can be used or clear or opaque adhesives or breakaway layers. Additionally, opaque adhesives, coatings and films can be used to mask printed indicia or an inserted item or items such as a radio frequency transmitter.

As used herein, the term "film" is used synonymously with term "polymer film".

All such obvious modifications are within the full intended scope of the appended claims.

The invention claimed is:

1. An article of manufacture for providing a separable and removable segment, label or coupon, comprising: (i) a first thin film layer having an upper surface with optional printed indicia and a lower surface with optional printed indicia which is permanent bond interface A; (ii) a second thin film layer having an upper surface and a lower surface, the upper surface being adhesively secured, directly, or through an underlying thin coated layer with optional printed indicia to the lower permanently bonded interface A of said lower surface of said first thin film layer (i) at a separable interface B; (iii) a paper or film substrate optionally printed with indicia laminated to the upper surface of the first thin film layer (i) with adhesive; (iv) an optional adhesive layer on the lower surface of second thin film layer (ii); (v) an optional releasable liner if a pressure sensitive adhesive is used as (iv); and (vi) a removable segment, label or coupon, having edges and being defined in said first thin film layer (i), by a diecut extending through said layers (iii), and (i) but not through said second thin film layer (ii) to form a removable diecut piece if the removable diecut piece is less than the total size of the removable segment, label or coupon and through second thin film layer (ii) if the removable diecut piece is the total size of the removable segment, label or coupon, wherein the removable diecut piece is provided with a pattern of selective variable adhesion through variable surface-treatment of the lower surface of said first thin layer (i) by applying no surface treatment in some areas and surface treatment in other areas by a corona treatment, flame treatment, plasma treatment or a combination thereof, the upper surface of layer (ii) or both of said surfaces such that the adhesion at separable interface B is always less than the adhesion at permanent interface A wherein said label or coupon is removable.

2. An article as in claim 1, wherein the pattern of the differentially treated area extends under the removable area defined by the diecut.

3. An article as in claim 1, wherein the film layer or layers comprise a polyester film, 0.2 to 7 mils thick.

4. An article as in claim 1, wherein the substrate layer comprises paper stock of 15 to 150 # weight.

5. An article as in claim 1, wherein said treatment is carried out under conditions which produce a measurable differential of at least 1 dyne/cm, measured at the time of treatment.

6. An article as in claim 1, wherein the pattern of the treated area covers from at least about 10 to about 90 percent of the surface and the untreated area covers from at least about 90 to about 10 percent of the surface.

7. An article as in claim 6, wherein the pattern of the treated area covers from at least about 40 to about 60 percent of the surface and the untreated area covers from at least about 60 to about 40 percent of the surface.

8. An article as in claim 1, wherein pattern of the treated area comprises a geometric form.

9. An article as in claim 8, wherein said geometric form is selected from a saw-tooth, a sine-wave, a herring-bone, a closed curve, a polygon, or any obvious equivalent thereof.

10. An article as in claim 1, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

11. An article as defined in claim 1 where the article includes a radio frequency transmitter buried in at least one of the article elements.

12. An article as in claim 1, wherein the surface treatment is a corona treatment or a plasma treatment.

13. An article of manufacture for providing a separable and removable segment, label or coupon, comprising: (i) a first thin film layer having an upper surface with optional indicia and a lower surface which is separable bond interface B; (ii) a second thin film layer having an upper surface and a lower surface, the upper surface being adhesively secured, directly, or through an underlying thin coated layer to the lower separable bonded interface B of said upper surface of second thin film layer (ii) at a permanent interface A; (iii) a paper or film substrate optionally printed with indicia laminated to the upper surface of the first thin film layer; (iv) an optional adhesive layer on the lower surface of second thin film later (ii); (v) an optional releasable liner pressure sensitive adhesive is used as (iv); and (vi) a removable segment, label or coupon, having edges and being defined in said first thin film layer (i), and said second film layer (ii) by a diecut extending through said layers (iii), and (i) but not through said second thin film layer (ii) to form a removable diecut piece if the removable diecut piece is less than the total size of the removable segment, label or coupon and through second thin film layer (ii) if the removable piece is the total size of the removable segment, label or coupon, wherein the removable diecut piece is provided with a pattern of selective variable adhesion through variable surface-treatment of the upper surface of said first layer (i) by applying no surface treatment in some areas and surface treatment in other areas by a corona treatment, flame treatment, plasma treatment or a combination thereof, the lower surface of layer (ii) or both of said surfaces such that the adhesion at separable interface B is always less than the adhesion at permanently-bonded interface A wherein said removable diecut piece is removable.

14. An article as in claim 13, wherein the pattern of the differentially treated area extends under the removable area defined by the diecut.

15. An article as in claim 13, wherein the film layer or layers comprise a polyester film, 0.2 to 7 mils thick.

16. An article as in claim 13, wherein the substrate layer comprises paper stock of 15 to 150 # weight.

17. An article as in claim 13, wherein said treatment is carried out under conditions which produce a measurable differential of at least 1 dyne/cm, measured at the time of treatment.

18. An article as in claim 13, wherein the pattern of the treated area covers from at least about 10 to about 90 percent of the surface and the untreated area covers from at least about 90 to about 10 percent of the surface.

19. An article as in claim 18, wherein the pattern of the treated area covers from at least about 40 to about 60 percent of the surface and the untreated area covers from at least about 60 to about 40 percent of the surface.

20. An article as in claim 13, wherein pattern of the treated area comprises a geometric form.

21. An article as in claim 20, wherein said geometric form is selected from a saw-tooth, a sine-wave, a herring-bone, a closed curve, a polygon, or any obvious equivalent thereof.

22. An article as in claim 13, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

23. An article as defined in claim 13 where the article includes a radio frequency transmitter buried in at least one of the article elements.

24. A article of manufacture for providing a removable segment, label or coupon comprising: (i) a first thin film layer having an upper surface with optional printed indicia and a lower surface which is permanent bond interface A; (ii) a second thin film layer having an upper surface and a lower surface, the upper surface being adhesively secured, directly, or through an underlying thin coated layer to the lower permanently bonded interface A of said lower surface of said first thin film layer (i) at a separable interface B; (iii) a paper or film substrate optionally printed with indicia laminated to the upper surface of the first thin film layer; (iv) an optional adhesive layer on the lower surface of second thin film layer (ii); (v) an optional releasable liner (v) if a pressure sensitive adhesive is used as (iv); and (vi) a removable segment, label or coupon, having edges and being defined in said first thin film layer (i), and said second film layer (ii) by a diecut extending through said layers (iii), and (i) but not through said second thin film layer (ii) to form a removable diecut piece if the removable diecut piece is less than the total size of the removable segment, label or coupon and through second thin film layer (ii) if the removable piece is the total size of the label, wherein the removable diecut piece is provided with a pattern of selective variable adhesion through variable surface-treatment of the upper surface of said first layer (i) by applying no surface treatment in some areas and surface treatment in other areas by a corona treatment, flame treatment, plasma treatment or a combination thereof, the lower surface of layer (ii) or both of said surfaces such that the adhesion at separable interface B is always less than the adhesion at permanently-bonded interface.

25. An article as in claim 24, wherein the pattern of the differentially treated area extends under the area defined by the diecut.

26. An article as in claim 24, wherein the film layer or layers comprise a polyester film, 0.2 to 7 mils thick.

27. An article as in claim 24, wherein the substrate layer comprises paper stock of 15 to 150 # weight.

28. An article as in claim 27, wherein the pattern of the treated area covers from at least about 10 to about 90 percent of the surface and the untreated area covers from at least about 90 to about 10 percent of the surface.

29. An article as in claim 28, wherein the pattern of the treated area covers from at least about 40 to about 60 percent of the surface and the untreated area covers from at least about 60 to about 40 percent of the surface.

30. An article as in claim 24, wherein said treatment is carried out under conditions which produce a measurable differential of at least 1 dyne/cm, measured at the time of treatment.

31. An article as in claim 24, wherein the pattern of the treated area comprises a geometric form.

32. An article as in claim 31, wherein said geometric form is selected from a saw-tooth, a sine-wave, a herring-bone, a closed curve, a polygon, or any obvious equivalent thereof.

33. An article as in claim 24, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

34. An article as defined in claim 24 where the article includes a radio frequency transmitter buried in at least one of the article elements.

35. An article of manufacture having a removable segment, label or coupon comprising: (i) a first thin film layer having an upper surface with optional printed indicia and a lower surface which is separable bond interface B; (ii) a second thin film layer having an upper surface and a lower surface, the upper surface being adhesively secured, directly, or through an underlying thin coated layer to the lower separably bonded interface B of said lower surface of said first thin film layer (i) at a permanent interface A; (iii) a paper or film substrate optionally printed with indicia laminated to the upper surface of the first thin film layer; (iv) an optional adhesive layer on the lower surface of second thin film later (ii); (v) an optional releasable liner if a pressure sensitive adhesive is used as (iv); and (vi) a removable segment, label or coupon, having edges and being defined in said first thin film layer (i), by a diecut extending through said layers (iii), and (i) but not through said second thin film layer (ii) to form a removable diecut piece if the removable diecut piece is less than the total size of the removable segment, label or coupon and through second thin film layer (ii) if the removable diecut piece is the total size of the removable segment, label or coupon wherein the removable diecut piece is provided with a pattern of selective variable adhesion through variable surface-treatment of the lower surface of said first layer (i) by applying no surface treatment in some areas and surface treatment in other areas by a corona treatment, flame treatment, plasma treatment or a combination thereof, the upper surface of layer (ii) or both of said surfaces such that the adhesion at separable interface B is always less than the adhesion at permanent interface A and said removable diecut piece is removable.

36. An article as in claim 35, wherein the pattern of the differentially treated area extends under the area defined by the diecut.

37. An article as in claim 35, wherein the layer or layers comprise a polyester film, 0.2 to 7 mils thick.

38. An article as in claim 35, wherein the substrate layer comprises paper stock of 15 to 150 # weight.

39. An article as in claim 35, wherein said treatment is carried out under conditions which produce a measurable differential of at least 1 dyne/cm, measured at the time of treatment.

40. An article as in claim 35, wherein the pattern of the treated area covers from at least about 10 to about 90 percent of the surface and the untreated area covers from at least about 90 to about 10 percent of the surface.

41. An article as in claim 40, wherein the pattern of the treated area covers from at least about 40 to about 60 percent of the surface and the untreated area covers from at least about 60 to about 40 percent of the surface.

42. An article as in claim 35, wherein the pattern of the treated area comprises a geometric form.

43. An article as in claim 42, wherein said geometric form is selected from a saw-tooth, a sine-wave, a herring-bone, a closed curve, a polygon, or any obvious equivalent thereof.

44. An article as in claim 35, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

45. An article as defined in claim 35 where the article includes a radio frequency transmitter buried in at least one of the article elements.

46. An article as in claim 35, wherein the surface treatment is a corona treatment or a plasma treatment.

47. An article of manufacture for providing a separable and removable segment, label or coupon, comprising: (i) a paper or film substrate optionally printed with indicia having an upper and a lower surface laminated at a permanent interface A to the upper surface of; (ii) a thin film layer having an upper surface and a lower surface, the upper surface being adhesively secured, directly, or through an underlying thin coated layer to the permanent interface A of said lower surface of said paper or film substrate (i) at a separable interface B; (iii) an optional adhesive layer on the lower surface of said thin film layer (ii); (iv) an optional releasable liner if a pressure sensitive adhesive is used as (iv); and (v) a removable segment, label or coupon, having edges and being defined in said paper or film substrate optionally printed with indicia (i) and in said thin film layer (ii) by a diecut extending through said layer (i), but not through said thin film layer (ii) to form a removable diecut piece if the removable diecut piece is less than the total size of the removable segment, label or label and through thin film layer (ii) if the removable diecut piece is the total size of the removable segment, label or coupon, wherein the removable diecut piece is provided with a pattern of selective variable adhesion through variable surface-treatment of the upper surface of layer (ii) by applying no surface treatment in some areas and surface treatment in other areas by a corona treatment, flame treatment, plasma treatment or a combination thereof such that the adhesion at separable interface B is always less than the adhesion at permanent interface A and said removable diecut piece is removable.

48. An article as in claim 47, wherein the pattern of the differentially treated area extends under the removable area defined by the diecut.

49. An article as in claim 47, wherein the layer or layers comprise a polyester film, 0.2 to 7 mils thick.

50. An article as in claim 47, wherein the substrate layer comprises paper stock of 15 to 150 # weight.

51. An article as in claim 47, wherein said treatment is carried out under conditions which produce a measurable differential of at least 1 dyne/cm, measured at the time of treatment.

52. An article as in claim 47, wherein the pattern of the treated area covers from at least about 10 to about 90 percent of the surface and the untreated area covers from at least about 90 to about 10 percent of the surface.

53. An article as in claim 52, wherein the pattern of the treated area covers from at least about 40 to about 60 percent of the surface and the untreated area covers from at least about 60 to about 40 percent of the surface.

54. An article as in claim 47, wherein pattern of the treated area comprises a geometric form.

55. An article as in claim 54, wherein said geometric form is selected from a saw-tooth, a sine-wave, a herring-bone, a closed curve, a polygon, or any obvious equivalent thereof.

56. An article as in claim 47, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

57. An article as defined in claim 47 where the article includes a radio frequency transmitter buried in at least one of the article elements.

58. An article as in claim 47 wherein the surface treatment is a corona treatment or a plasma treatment.

59. An article of manufacture for providing a separable and removable segment, label or coupon, comprising: (i) a paper or film substrate optionally printed with indicia having an upper and a lower surface laminated at a permanent interface A to the upper surface of; (ii) a thin film layer having an upper surface and a lower surface, the upper surface being adhesively secured, to the permanent interface A of said lower surface of said paper or film substrate (i) at a separable interface B; (iii) an optional adhesive layer on the lower surface of said thin film layer (ii); (iv) an optional releasable liner if a pressure sensitive adhesive is used as (iv); and (v) a removable segment, label or coupon, having edges and being defined by a diecut extending through said layer (i), but not through said thin film layer (ii) to form a removable diecut piece if the removable diecut piece is less than the total size of the removable segment, label or coupon and through thin film layer (ii) if the removable diecut piece is the total size of the removable segment, label or coupon, wherein the removable diecut piece is provided with a pattern of selective variable adhesion through variable surface-treatment of the upper surface of layer (ii) by applying no surface treatment in some areas and surface treatment in other areas by a corona treatment, flame treatment, plasma treatment or a combination thereof such that the adhesion at separable interface B is always less than the adhesion at permanent interface A and said removable diecut piece is removable.

60. An article as in claim 59, wherein the pattern of the differentially treated area extends under the removable area defined by the diecut.

61. An article as in claim 59, wherein the layer or layers comprise a polyester film, 0.2 to 7 mils thick.

62. An article as in claim 59, wherein the substrate layer comprises paper stock of 15 to 150 # weight.

63. An article as in claim 59, wherein said treatment is carried cut under conditions which produce a measurable differential of at least 1 dyne/cm, measured at the time of treatment.

64. An article as in claim 59, wherein the pattern of the treated area covers from at least about 10 to about 90 percent of the surface and the untreated area covers from at least about 90 to about 10 percent of the surface.

65. An article as in claim 64, wherein the pattern of the treated area covers from at least about 40 to about 60 percent of the surface and the untreated area covers from at least about 60 to about 40 percent of the surface.

66. An article as in claim 59, wherein pattern of the treated area comprises a geometric form.

67. An article as in claim 66, wherein said geometric form is selected from a saw-tooth, a sine-wave, a herring-bone, a closed curve, a polygon, or any obvious equivalent thereof.

68. An article as in claim 59, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

69. An article as defined in claim 59 where the article includes a radio frequency transmitter buried in at least one of the article elements.

70. An article of manufacture for providing a separable and removable segment, label or coupon, comprising: (i) a paper or film substrate optionally printed with indicia having an upper and a lower surface laminated at a permanent interface A; to the upper surface of (ii) a thin film layer having an upper surface and a lower surface, the lower surface being adhesively secured through an underlying thin coated layer at a separable interface B; to the upper surface of (iii) a pressure sensitive adhesive layer on the upper surface of; (iv) a releasable liner; and (v) a removable segment, label or coupon, having edges and being defined in said thin film layer (ii), and in said pressure sensitive adhesive layer (iii) by a diecut extending through said layers (i) and (iii) wherein the removable diecut piece is provided with a pattern of selective variable adhesion through variable surface-treatment of the lower surface of layer (ii) by applying no surface treatment in some areas and surface treatment in other areas by a corona treatment, flame treatment, plasma treatment or a combination thereof such that the adhesion at separable interface B is always less than the adhesion at permanent interface A and said removable diecut piece is removable.

71. An article as in claim 70, wherein the pattern of the differentially treated area extends under the removable area defined by the diecut.

72. An article as in claim 70, wherein the layer or layers comprise a polyester film, 0.2 to 7 mils thick.

73. An article as in claim 70, wherein the substrate layer comprises paper stock of 15 to 150 # weight.

74. An article as in claim 70, wherein said treatment is carried out under conditions which produce a measurable differential of at least 1 dyne/cm, measured at the time of treatment.

75. An article as in claim 70, wherein the pattern of the treated area covers from at least about 10 to about 90 percent of the surface and the untreated area covers from at least about 90 to about 10 percent of the surface.

76. An article as in claim 75, wherein the pattern of the treated area covers from at least about 40 to about 60 percent of the surface and the untreated area covers from at least about 60 to about 40 percent of the surface.

77. An article as in claim 70, wherein pattern of the treated area comprises a geometric form.

78. An article as in claim 77, wherein said geometric form is selected from a saw-tooth, a sine-wave, a herring-bone, a closed curve, a polygon, or any obvious equivalent thereof.

79. An article as in claim 70, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

80. An article as defined in claim 70 where the article includes a radio frequency transmitter buried in at least one of the article elements.

81. An article as in claim 70 wherein the surface treatment is a corona treatment or a plasma treatment.

82. An article of manufacture for providing a separable and removable segment, label or coupon, comprising: (i) a paper or film substrate optionally printed with indicia and having an upper and a lower surface; (ii) a thin film layer having an upper surface and a lower surface, the lower surface being adhesively secured, by a dry adhesive with release properties at a permanent interface A; to upper surface of (iii) a support layer; (iv) a removable segment, label or coupon, having edges and being defined in said thin film layer, and in said dry adhesive with release properties layer (ii) by a diecut extending through said layers (i) and (ii) but not through said support layer (iii) wherein the removable diecut piece is provided with a pattern of selective variable adhesion through variable surface-treatment of the lower surface of layer (ii) upper surface of support layer (iii) or both said surfaces by applying no surface treatment in some areas and surface treatment in other areas by a corona treatment, flame treatment, plasma treatment or a combination thereof such that the adhesion at separable interface B is always less than the adhesion at permanent interface A and said removable diecut piece is removable.

83. An article as in claim 82, wherein the pattern of the differentially treated area extends under the removable area defined by the diecut.

84. An article as in claim 82, wherein the layer or layers comprise a polyester film, 0.2 to 7 mils thick.

85. An article as in claim 82, wherein the substrate layer comprises paper stock of 15 to 150 # weight.

86. An article as in claim 82, wherein said treatment is carried out under conditions which produce a measurable differential of at least 1 dyne/cm, measured at the time of treatment.

87. An article as in claim 82, wherein the pattern of the treated area covers from at least about 10 to about 90 percent of the surface and the untreated area covers from at least about 90 to about 10 percent of the surface.

88. An article as in claim 87, wherein the pattern of the treated area covers from at least about 40 to about 60 percent of the surface and the untreated area covers from at least about 60 to about 40 percent of the surface.

89. An article as in claim 82, wherein pattern of the treated area comprises a geometric form.

90. An article as in claim 89, wherein said geometric form is selected from a saw-tooth, a sine-wave, a herring-bone, a closed curve, a polygon, or any obvious equivalent thereof.

91. An article as in claim 82, wherein the surface tension of the surface treatment is set to a predetermined level by increasing or decreasing the power of the treatment, by increasing or decreasing the exposure time of the treatment, or by increasing or decreasing the distance between the treatment source and the surface to which said treatment is applied.

92. An article as defined in claim 82 where the article includes a radio frequency transmitter buried in at least one of the article elements.

93. A method of making a removable polymer substrate laminate or a segment thereof which comprises (a) treating a polymer substrate with a surface treatment technique to selectively modify the surface in a predetermined pattern by applying no surface treatment in some areas and surface treatment in other areas by a corona treatment, flame treatment, plasma treatment or a combination thereof; (b) coating a portion of the treated surface of the product of step (a) with an adhesive and a breakaway layer; and (c) laminate a second substrate onto the adhesive and a breakaway layer the product of step (b).

94. A method as in claim 93 wherein the surface treatment is a corona treatment or a plasma treatment.

* * * * *